L. DINESEN.
MILKING APPARATUS.
APPLICATION FILED SEPT. 15, 1917.
1,353,570.
Patented Sept. 21, 1920.
2 SHEETS—SHEET 1.
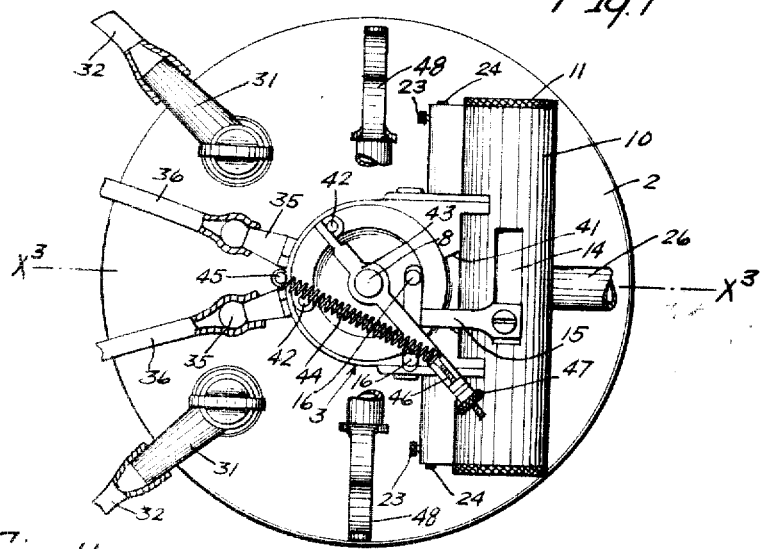
Fig. 1
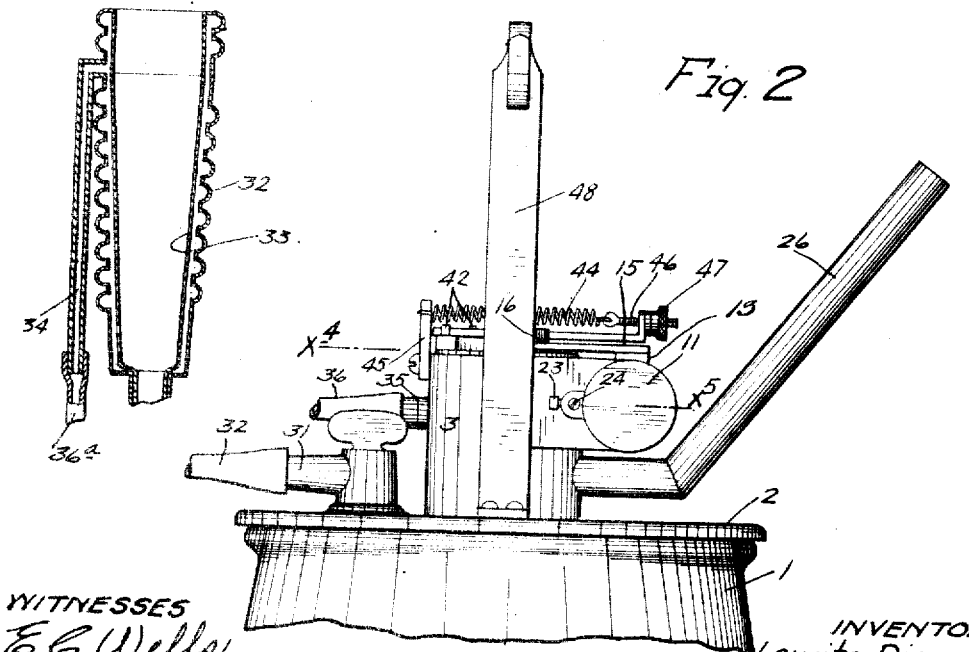
Fig. 11
Fig. 2
WITNESSES
E. C. Wells
H. L. Opsahl
INVENTOR
Laurits Dinesen
BY HIS ATTORNEYS
Williamson Merchant

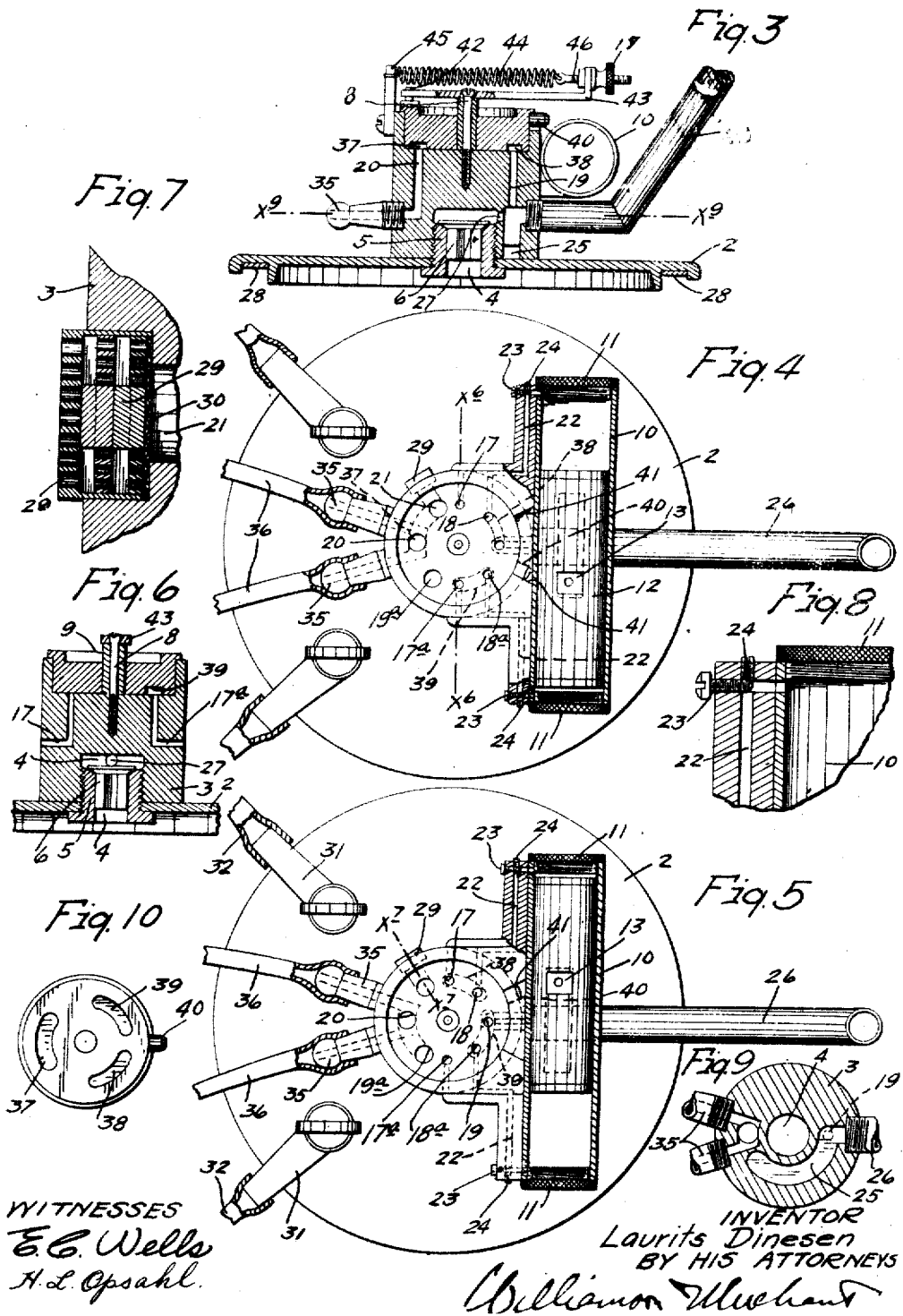

UNITED STATES PATENT OFFICE.

LAURITS DINESEN, OF MINNEAPOLIS, MINNESOTA, ASSIGNOR TO PERFECTION MANUFACTURING COMPANY, OF MINNEAPOLIS, MINNESOTA, A CORPORATION OF MINNESOTA.

MILKING APPARATUS.

1,353,570.   Specification of Letters Patent.   Patented Sept. 21, 1920.

Application filed September 15, 1917. Serial No. 191,609.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My invention relates to milking apparatus, and particularly, is directed to the provision of an improved means for producing pulsations required in the milking action. To the above ends, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a plan view showing the top of a milk can and with my improved pulsating mechanism applied thereon;

Fig. 2 is a side elevation of the parts shown in Fig. 1;

Fig. 3 is a section taken approximately on the line $x^3$ $x^3$ of Fig. 1;

Figs. 4 and 5 are views partly in plan and partly in horizontal section on the irregular line $x^4$ $x^5$ of Fig. 2, but illustrating different positions of certain of the movable parts;

Fig. 6 is a detail in section on the line $x^6$ $x^6$ of Fig. 4, some parts being removed;

Fig. 7 is a detail in section taken on the line $x^7$ $x^7$ of Fig. 5;

Fig. 8 is an enlarged horizontal section on the same line as Fig. 4 showing a portion of one end of the cylinder of the air engine;

Fig. 9 is a horizontal section on the line $x^9$ $x^9$ of Fig. 3;

Fig. 10 is a bottom plan view of the controller valve; and

Fig. 11 is a section showing in detail, one of the teat cups of the milking apparatus.

In the preferred embodiment of my invention, the pulsator mechanism is applied on top of the cover of the milk receiving pail of the milking apparatus, and comprises, among other things, a cylinder and piston, suction actuated air engine.

In the drawings, the milk can is indicated by the numeral 1 and its tightly fitted cover by the numeral 2. Rising from and rigidly secured on the cover 2, is a metallic hub 3 that is formed with a central air chamber 4. The threaded end of a coupling sleeve 5 is passed axially through the cover 2 and screwed into the chamber 4, thereby rigidly attaching the hub 3 to the said cover. The sleeve 5 affords a seat for a check valve 6.

The upper portion of the hub 3 is faced to afford a valve seat for an oscillatory controller valve 7, which latter is pivotally connected thereto by means of a stud 8. As shown, this controller valve has a sleeve-like hub 9 that directly engages with the said stud.

The cylinder 10 might be cast integral with the hub casting 3, but, as shown, it is separately formed but rigidly secured thereto, and is provided with heads 11 detachably held in position by threaded engagement. Working within the cylinder is a piston 12. The piston 12, on top, has a lug 13 that works in a slot 14 in the top of the cylinder, and to this lug is rigidly attached a T-shaped trip arm 15 equipped on its head with tappets 16 laterally offset from but spaced longitudinally of the axis of the cylinder and piston.

In the valve seat formed in the upper face of the hub 3, are circumferentially spaced ports 17—17ª, 18—18ª, 19—19ª, 20 and 21. The ports 18—18ª, through air conduits 22 are connected to the opposite ends of the cylinder 10, and the conducting capacities of these passages 22 are adapted to be regulated by small needle valves 23 (see Fig. 8) shown as adapted to be held in their set positions by small set screws 24. The ports 17—17ª open to the atmosphere through diametrically opposite sides of the hub 3. The ports 19—19ª are connected by a channel 25 (see particularly Fig. 9) formed in the lower portion of the hub 3. This channel 25 is in constant communication with the vacuum or suction tube 26 that is connected directly or indirectly to an air pump or other well known means for producing partial vacuum or suction. This constant partial vacuum is maintained in the milk can, and to this end, the channel 25, which is in constant communication with the vacuum pipe 26, is connected to the chamber 4 of the hub 3, at a point above the check valve 6, by means of a small port 27, best shown in Figs. 3 and 6. The check valve 6, obviously, prevents air from flowing in a direction from the chamber 25 into the milk can, and to form a tight joint between the cover 2 and the rim of the milk can, the former is shown as provided with an inset annular gasket 28.

The port 21 is an air intake port and is connected with the atmosphere, as shown, through a muffler 29 (see particularly Fig. 7) and screen 30.

The cover 2 is provided with valve-equipped milk intake nipples 31, which, by the usual flexible milk conducting tubes 32, will be connected to the teat cups. The teat cups employed are preferably of the type wherein an elastic inner wall is placed within a rigid outer wall or shell and pressure impulses are produced in the annular chamber between the two walls. Such a teat cup is disclosed and claimed in my prior Patent 1,072,584, of date September 9, 1913, entitled "Milking apparatus", and a teat cup of such construction, is illustrated in Fig. 11, wherein the numeral 32$^a$ indicates the rigid outer wall and the numeral 33 indicates the elastic inner wall of the said teat cup. A small air tube 34, attached to the outer shell 32$^a$, opens into the annular chamber formed between the two walls.

The milking apparatus shown is designed for use to simultaneously milk two cows, and hence, the hub 3 is provided with two small projecting nipples 35 that are in constant communication with the above noted port 20. Each nipple 35 is connected to one end of a flexible tube or hose 36, the other end of which will, by suitable branch tubes 36$^a$, be connected to the tubes 34 of the corresponding group of four teat cups usually employed.

The controller valve 7, in its lower face, is formed with three circumferentially spaced segmental pocket-like ports 37, 38 and 39, the said ports being best shown in Fig. 10, but also being indicated by dotted lines in Figs. 4 and 5. Oscillatory movements of the controller valve 7 are limited by a stop 40 on said valve, which works between stop shoulders 41 on the upper portion of the hub 3. On the top of the controller valve 7, are circumferentially spaced striking pins or surfaces 42 that are adapted to be alternately engaged by one end of an actuating lever 43 that is intermediately pivoted on the upper portion of the stud 8. The long end of this lever 43 works between the tappets 16 of the piston-carried arms 15. The said actuating lever 43 is subject to the tension of a coiled spring 44, one end of which, as shown, is anchored to a small post 45 on the hub 3, and the other end of which is adjustably attached to the long end of the said lever, by means of a small eye-bolt 46 and cooperating thumb nut 47.

In Figs. 1 and 2, the numeral 48 indicates hanger hooks applied on the cover 2 for supporting the flexible tubes, but which, however, constitute no part of the present invention.

*Operation.*

Starting the description with the parts in the positions indicated in Figs. 1, 3, 4 and 6, it will be noted that the valve port 38 connects the seat ports 18 and 19, that the valve port 39 connects the seat ports 17$^a$ and 18$^a$, that the valve port 37 connects the air intake port 21 and the seat port 20, and that the seat ports 17 and 19$^a$ are then closed. Under these conditions, atmospheric air is admitted to the air tubes 36 and annular chamber of the teat cups, through the said ports 21, 37 and 20; atmospheric air is admitted to the near end of the cylinder 10, through the said ports 17$^a$, 39, 18$^a$ and cooperating conduit 22; and the far end of the cylinder 10 is connected to the vacuum tube 26, through the far conduit 22 and the said ports 18, 38 and 19. All of the time, of course, the partial vacuum is maintained in the milk can, and hence, in the chamber formed within the inner elastic walls 33 of the teat cups, so that atmospheric pressure then being admitted to the annular chambers of the teat cups, the said elastic walls will be contracted. Atmospheric pressure being then admitted into the near end of the cylinder, the piston is free to move, and will then be moved by the partial vacuum produced in the opposite end of the cylinder. When the piston moves it will carry the valve actuating lever 43 with it, but the latter will not immediately move the said valve, because of the clearance between the same and the striking pins 42. When, however, the piston quite closely approaches the limit of its movement, the lever 43 will be carried past its neutral or dead center position, in respect to the spring 44, and the latter will then impart to the said lever a very quick movement, causing the same to jump ahead of the piston, and t e latter part of the movement of the said le er will engage its short end with the near striking pin, and impart to the controller valve an almost instantaneous movement, shifting the same from the position shown in Fig. 4 into the position shown in Fig. 5. In this position of the controller valve shown in Fig. 5, the valve port 37 connects the ports 20 and 19$^a$; the valve port 38 connects the seat ports 17 and 18; the valve port 39 connects the seat ports 19 and 18$^a$; and the seat ports 21 and 17$^a$ are then closed. At this time, therefore, the annular chambers of the teat cups, through the said ports 20, 37 and 19$^a$, and the channel 25, will be connected to the vacuum tube 26, so that the elastic inner walls of the teat cups will be expanded; the far end of the cylinder 10 will be open to the atmosphere through the said ports 18, 38 and 17, so that the piston is then free to move and the near end of the cylinder will be connected to the vacuum tube 26, through the said ports 18ª, 39 and 19, and the conduit 25, so that the piston will then be caused to move back to the position indicated in Fig. 4. When the piston makes this backward movement, the actuating lever 43 and controller valve will be given movements such as above described in detail, only, of course, in the opposite direction.

In the manner above described, the piston will continuously reciprocate and the controller valve will be intermittently oscillated, producing the alternate impulses in the teat cups required to produce the proper milking action, and all the time, of course, a constant partial vacuum will be maintained in the milk can, and hence, in the milk delivery tubes of the apparatus. Furthermore, only one pressure impulse is produced for each complete movement of the piston and, moreover, the movement of the valve consumes but a very small part of the interval of time taken for a complete movement or reciprocation of the piston. This, of course, gives relatively long pressure impulses, in respect to the speed of movement of the piston. The speed of movement of the piston may be varied by adjustments of the small choke valves 23 in the conduits 22, it being, of course, understood that by opening the said valves, the speed of the piston may be increased and that by more nearly closing the said valves, the speed of the piston movement may be decreased. By such regulations, the apparatus may be adjusted for just the proper drawing action in the teat cups. The controller valve, so-called, as will be understood from the foregoing description, serves not only to alternate the pressure impulses in the teat cup connections, but also controls the movements of the piston of the reciprocating engine or fluid pressure motor. The efficiency of the apparatus described has been demonstrated in practice.

What I claim is:—

1. In a milking apparatus, the combination with a milk receptacle, of a coöperating cylinder and piston, a teat cup milk connection leading to said receptacle, a teat cup air connection, a vacuum tube, a valve seat having three atmospheric ports, two ports connected one to each end of said cylinder, two ports connected to said vacuum tube and a port in communication with said teat cup air connection, a controller valve having ports coöperating with the seat ports enumerated to alternately connect the opposite ends of said cylinder to the atmosphere and to said vacuum tube and to alternately connect the port of said teat cup air connection to the atmosphere and to said vacuum tube, and connections whereby said piston will move said controller valve alternately from one position to another.

2. In a milking apparatus, the combination with a milk receptacle, of a coöperating cylinder and piston, a teat cup milk connection leading to said receptacle, a teat cup air connection, a vacuum tube, a valve seat having three atmospheric ports, two ports connected one to each end of said cylinder, two ports connected to said vacuum tube and a port in communication with said teat cup air connection, a controller valve having ports coöperating with the seat ports enumerated to alternately connect the opposite ends of said cylinder to the atmosphere and to said vacuum tube and to alternately connect the port of said teat cup air connection to the atmosphere and to said vacuum tube, a valve-actuating pivoted lever having a limited movement in respect to said controller valve, a tappet carried by said piston and operative on said actuating lever and a spring for normally maintaining the actuated end of the lever to one side or the other of its pivot, said tappet adapted to move the lever alternately from one side to the other of its neutral position in respect to its actuating spring.

3. In a milking apparatus, the combination with a milk receptacle, of a coöperating cylinder and piston, a teat cup milk connection leading to said receptacle, a teat cup air connection, a vacuum tube, a valve seat having three atmospheric ports, two ports connected one to each end of said cylinder, two ports connected to said vacuum tube and a port in communication with said teat cup air connection, a controller valve having ports coöperating with the seat ports enumerated to alternately connect the opposite ends of said cylinder to the atmosphere and to said vacuum tube and to alternately connect the port of said teat cup air connection to the atmosphere and to said vacuum tube, which controller valve is pivotally mounted and which ports are circumferentially spaced around its pivotal axis, and connections whereby said piston will move said controller valve alternately from one position to another.

4. In a milking apparatus, the combination with a milk receptacle, of a coöperating cylinder and piston, a teat cup milk connection leading to said receptacle, a teat cup air connection, a vacuum tube, a valve seat having three atmospheric ports, two ports connected one to each end of said cylinder, two ports connected to said vacuum tube, and a port in communication with said teat cup air connection, a controller valve having ports coöperating with the ports enumerated to alternately connect the opposite ends of said cylinder to the atmosphere and to said vacuum tube and to alternately connect the port of said teat cup air connection to the atmosphere and to said vacuum tube, which controller valve is pivotally mounted and which ports are circumferentially spaced around its pivotal axis, a valve-actuating pivoted lever having a limited movement in respect to said controller valve, a tappet carried by said piston and operative on said actuating lever and a spring for normally maintaining the actuating end of the lever to one side or the other of its pivot, said tappet adapted to move the lever alternately from one side to the other of its neutral position in respect to its actuating spring.

5. In a milking apparatus, the combination with a receptacle and vacuum communicating means, of a cover provided with a teat-cup connection, an oscillating valve carried by said cover interposed between said means and said connection, a cylinder provided with ports from its ends to said valve, a double-acting piston operable therein, said valve having ports therein adapted to intermittently place the connection in communication with the vacuum means and with the atmosphere and alternately place the opposite ends of the cylinder in communication with said means and with the atmosphere and means connecting the piston to the valve, whereby the valve will be moved upon the movement of the piston.

6. In a milking apparatus, the combination with a receptacle and vacuum communicating means, of a cover provided with teat-cup connections, a valve casing carried by said cover, an oscillating valve mounted in the casing, said casing provided with a communication between the interior of the casing and the vacuum communication means, a cylinder provided with ports from its ends to said valve, carried by said casing, a double-acting piston operable therein, said valve having ports therein adapted to intermittently place the connection in communication with the vacuum means and with the atmosphere and alternately place the opposite ends of the cylinder in communication with said means and with the atmosphere, and a lost motion connection between the piston and valve whereby the valve will be moved after an initial movement of the piston.

7. In a milking apparatus, the combination with a receptacle and vacuum communicating means, of a cover provided with a teat-cup connection, a valve casing carried by said cover, an oscillating valve mounted in the casing, a cylinder carried by said casing, provided with ports from its ends to said valve, a double-acting piston operable therein, said valve having ports therein adapted to intermittently place the connection in communication with the vacuum means and with the atmosphere, and alternately placing the opposite ends of the cylinder in communication with said means and with the atmosphere, means connecting the piston to the valve whereby the valve will be moved upon the movement of the piston, and means for controlling the rapidity of the movement of the piston.

In testimony whereof I affix my signature in presence of two witnesses.

LAURITS DINESEN.

Witnesses:
CLARA DEMAREST,
F. D. MERCHANT.